United States Patent [19]

Matsuo

[11] Patent Number: 5,634,005
[45] Date of Patent: May 27, 1997

[54] SYSTEM FOR AUTOMATICALLY SENDING MAIL MESSAGE BY STORING RULE ACCORDING TO THE LANGUAGE SPECIFICATION OF THE MESSAGE INCLUDING PROCESSING CONDITION AND PROCESSING CONTENT

[75] Inventor: Akira Matsuo, Yokohama, Japan

[73] Assignee: Kabushiki Kaisha Toshiba, Kawasaki, Japan

[21] Appl. No.: 658,015

[22] Filed: Jun. 4, 1996

Related U.S. Application Data

[63] Continuation of Ser. No. 145,527, Nov. 4, 1993, abandoned.

[30] Foreign Application Priority Data

Nov. 9, 1992 [JP] Japan ..................... 4-298839

[51] Int. Cl.⁶ ........................................... G06F 13/00
[52] U.S. Cl. ........................................... 395/200.02
[58] Field of Search .................. 395/200.01, 200.02, 395/200.16, 200.18, 600; 370/17, 60, 94.1

[56] References Cited

U.S. PATENT DOCUMENTS

| | | | |
|---|---|---|---|
| 4,424,565 | 1/1984 | Larson | 395/200.07 |
| 4,601,586 | 7/1986 | Bahr et al. | 370/94.1 |
| 4,704,717 | 11/1987 | King, Jr. | 370/85 |
| 5,398,245 | 3/1995 | Harriman, Jr. | 370/94.1 |

OTHER PUBLICATIONS

"Semistructured Messages are Surprisingly Useful Computer-Supported Coordination", Malone et al., Computer-Supported Cooperative Work: A Book of Readings, Morgan Kaufmann Publishers, Inc., pp. 311-329, 1988.

"Cooperative Work in the Andrew Message System", Borenstein et al., Proceedings of Conference on Computer-Supported Cooperative Work 88, pp. 306-323, 1988.

*Primary Examiner*—Thomas C. Lee
*Assistant Examiner*—Moustafa Mohamed Meky
*Attorney, Agent, or Firm*—Finnegan, Henderson, Farabow, Garrett & Dunner, L.L.P.

[57] ABSTRACT

An automatic sending-message processing device is applied to a computer network which is connected to a plurality of computer systems via communication media and capable of effecting message switching among the plurality of computer systems by use of an electronic mail system. The processing device includes a memory for storing a rule in which a processing condition for processing mail message data and a content of a process obtained when the processing condition is satisfied, which are described according to the language specification of the mail message. The processing device further includes a control information analyzer for analyzing control information of the mail message data, an interpreter for collating the analyzed control information with the processing condition to interpret a process to be executed, a processor for executing a process on the mail message data corresponding to the process interpreted by the interpreting means, and electronic mail sender for sending a mail message consisting of the processed mail message data as electronic mail to other computer system users.

19 Claims, 8 Drawing Sheets

IF {subject "(trans)"}

THEN {data transforming program}

IF {subject "(comp)"}

THEN {compressing program}

IF {subject "(crypto)"}

THEN {encipherment program}

IF {condition}
THEN {processing}

IF {condition}
THEN {processing}

FIG. 2

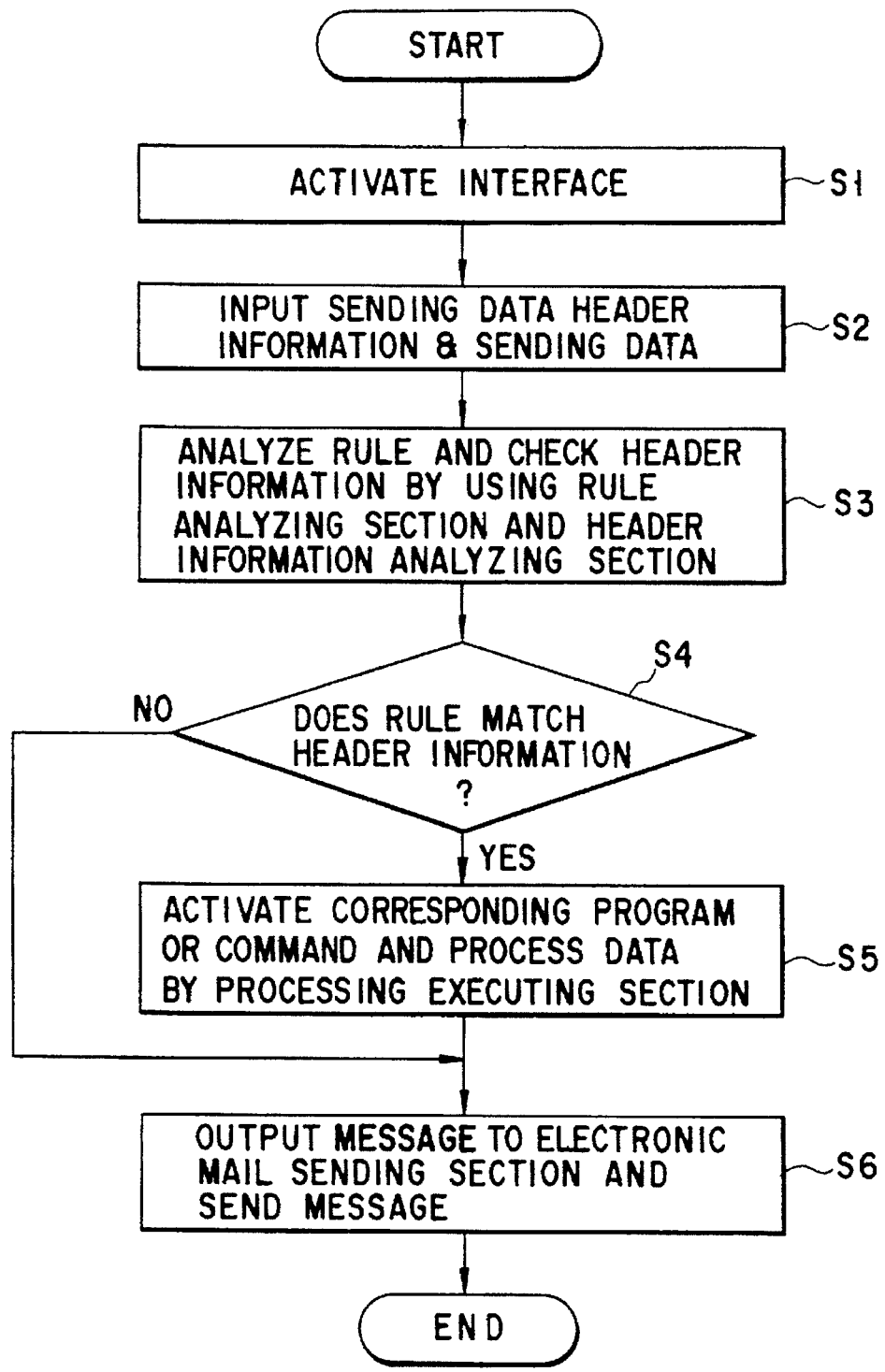
F I G. 3

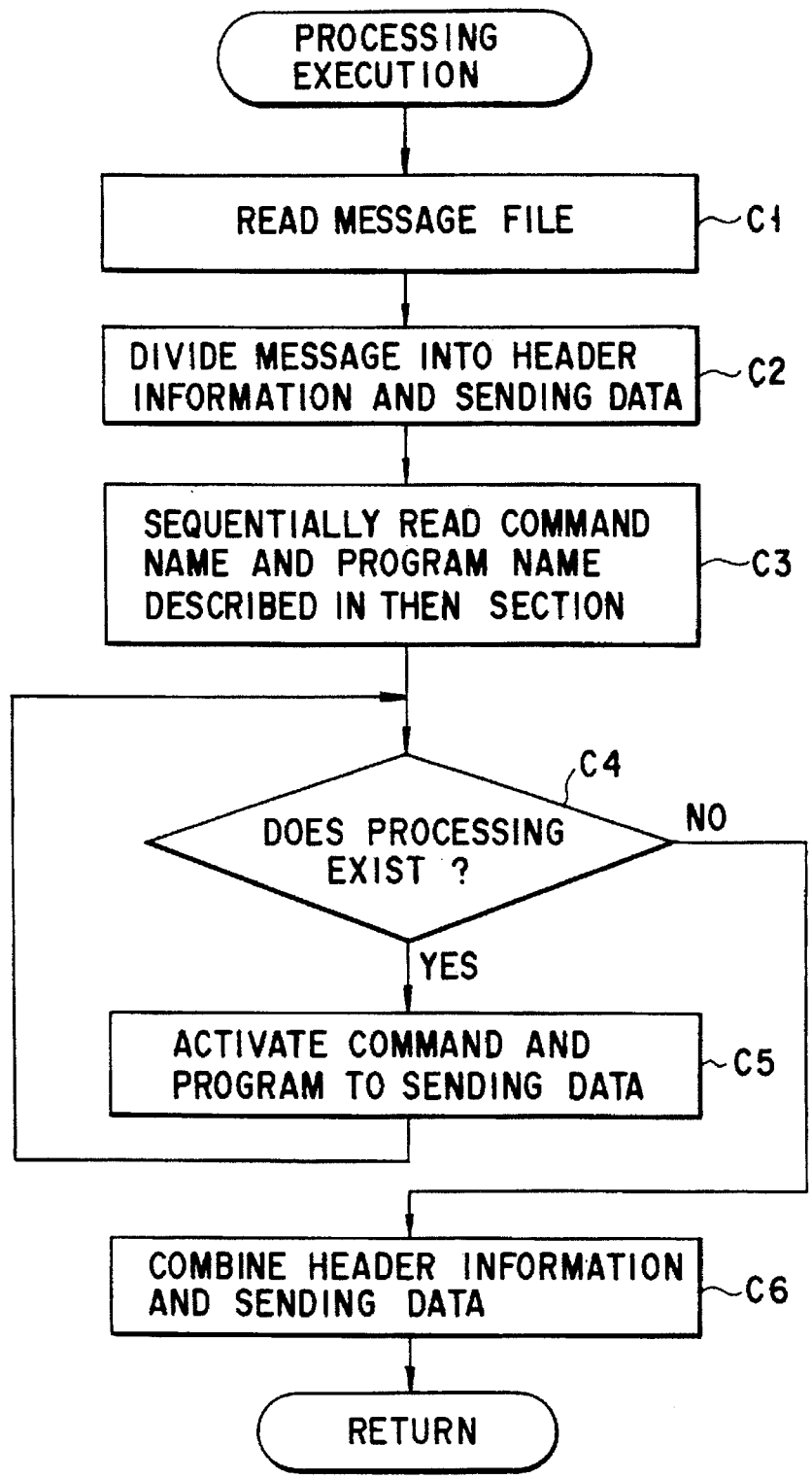
F I G. 6

```
IF {
    to("com")
}
THEN {
    copy_prg $/backup
}

IF {
    date<"1993.04.20"
}
THEN {
    mail_prg userA < $
}

IF {
    subject("crypto")
}
THEN {
    crypto_prg $
}

IF {
    subject("comp")
}
THEN {
    compress_prg $
}
```

FIG. 7

```
IF {
    to("com") AND subject("comp") AND
    subject("crypto")
}
THEN {
    copy_prg $/backup
    compress_prg $
    crypto_prg $
}
```

FIG. 8

```
   ⋮
IF {
    to ( " com" )
}
THEN {
    copy_prg $ / backup
}
IF {
    date < "1993.04.20"
}
THEN {
    IF {
        subject ( "crypto" )
    }
    THEN {
        crypto_prg $
        mail_prg userA < $
    }
}
IF {
    subject ( "comp" )
}
THEN {
    compress_prg $
}
   ⋮
```

FIG. 9

SYSTEM FOR AUTOMATICALLY SENDING MAIL MESSAGE BY STORING RULE ACCORDING TO THE LANGUAGE SPECIFICATION OF THE MESSAGE INCLUDING PROCESSING CONDITION AND PROCESSING CONTENT

This application is a continuation of application Ser. No. 08/145,527, filed Nov. 4, 1993, now abandoned.

BACKGROUND OF THE INVENTION

1. Field of the Invention

This invention relates to an automatic sending-message processing device and an automatic sending-message processing method in a so-called electronic mail system for interchanging sending messages among a plurality of computer systems which are connected to one another via communication media.

2. Description of the Related Art

A so-called electronic mail system for interchanging sending messages among a plurality of computer systems which are connected to one another via communication media is known.

Message data being sent by a computer user has various attributes. In a case where message switching is effected by use of the above electronic mail system, depending on their attributes, the message data may sometimes be sent without prior processing. In other cases, the message data may be sent through the electronic mail system after the user has activated a command for data processing such as data transformation and file operation.

The above is executed by manually activating the command for data processing before the user transmits the message data. Therefore, even if the data having the same attribute is sent a number of times, a command to process the data needs to be manually activated for each transmission. As a result, sending message through electronic mail tends to be complicated and not very efficient.

SUMMARY OF THE INVENTION

An object of this invention is to provide an automatic sending-message processing device and an automatic sending-message processing method capable of alleviating the complexity of the process for message sending by the computer user at the time of transmission by describing the processing of a message as a rule, automatically effecting the processing according to the rule, and then transmitting the message. More specifically, an object of this invention is to provide an automatic sending-message processing device and an automatic sending-message processing method which are designed to automate the processing and enhance the efficiency thereof by inserting a character string (key word) indicating the process to be effected on the message data into the header information at the time of transmission, analyzing the header information to automatically effect the process for the message data at the time of transmission, and then transmitting the message data together with the header information.

A first automatic sending-message processing device of this invention applied to a computer network which is connected to a plurality of computer systems via communication media and capable of effecting the message switching among the plurality of computer systems using electronic mail system, comprises rule storing means (rule file) for storing a rule in which a processing condition for processing message data and content of a process obtained when the processing condition is satisfied are described according to the language specification of the message data; control information analyzing means (header information analyzing section) for analyzing control information of the message data; interpreting means (rule analyzing section) for collating the analyzed control information with the processing condition to interpret a process to be executed; and processing means (process executing section) for executing a process corresponding to the process interpreted by the interpreting means. The first automatic sending message processing device of the invention also comprises sending means for sending the message data, which has been processed by the processing means, after attaching header information to the message data.

The rule storing means includes means for storing a condition section for describing identification information indicating the processing condition, and a processing section for describing the content of the process obtained when the processing condition is satisfied. The processing section may contain at least one pair of the condition section and the processing section. The rule storing means further includes means for storing a conditional expression obtained by combining a plurality of processing conditions by use of a logical expression.

The control information analyzing means includes means for extracting a character string containing at least addressee information, addresser information, subject information, and transmission date information, as well as means for setting the extracted character string as a variable.

The processing means includes means for separating header information and message data from each other and further including means for combining the processed header information and the message data.

A second automatic sending-message processing device of this invention applied to a computer network which is connected to a plurality of computer systems via communication media and capable of effecting the message switching among the plurality of computer systems using electronic mail system, comprises input means for inputting message data and control information for the message data; a rule file containing a set of multiple "condition section-processing section" sentences based on the language specification of the message data, the condition section having identification information indicating a process for the message data and the processing section having a process which is effected when the condition of the condition section is satisfied; header information analyzing means for analyzing the header information to obtain subject information indicating at least the content of the process corresponding to the message data; processing means for executing a process set in the processing section of the rule file; rule analyzing means for retrieving the rule file after analyzing the header information by means of the header information analyzing means, and executing the process set in the processing section on the message data by activating the processing means when the subject information coincides with the identification information; and sending means for sending the header information and the processed message data. The rule file is characterized by including means for storing a conditional expression derived by combining a plurality of processing conditions by use of a logical expression.

The header information analyzing means includes means for extracting addressee information, addresser information, and transmission date information, as well as means for setting the subject information, the addressee information, the addresser information, and the transmission date information as a variable.

An automatic sending-message processing method of this invention applied to a computer network which is connected to a plurality of computer systems via communication media and capable of effecting the message switching among the plurality of computer systems using an electronic mail system, comprises a first step of storing a rule in which a processing condition for processing message data and content of a process which is executed when the processing condition is satisfied are described according to the language specification; a second step of inputting message data and control information for the message data a third step of analyzing the control information of the message data; a fourth step of collating the analyzed control information with the processing condition; a fifth step of subjecting the message data to a preset process based on the collation; and a sixth step of sending the processed message data after attaching header information to the message data.

The first step includes preparing a conditional expression obtained by combining a plurality of processing conditions using a logical expression.

The third step includes extracting a character string containing at least addressee information, addresser information, subject information, and transmission date information, as well as setting the extracted character string as a variable.

The fifth step includes separating header information and message data from each other. The fifth step further includes combining the processed header information and the message data.

According to the device and method of this invention, since a character string (key word) indicating the process to be effected on the message data at the time of transmission is inserted into the header information, which is analyzed to automatically execute the process and sent together with the message data, the process can be automated and the efficiency thereof can be enhanced.

As described above, according to this invention, message data can be automatically processed and then sent by describing the process to be effected on the message data at the time of transmission as a rule based on the language specification of the message. That is, according to this invention, a process required prior to transmission and a process required at the destination can be automated according to the attributes of the message data by simply attaching a preset key word to the subject of the mail or the like. Therefore, the troublesome process to be effected on the message data before being sent by the user can be simplified, thereby making it possible to effect an efficient message switching.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a diagram schematically showing the construction of a rule file of the device of the first embodiment;

FIG. 3 is a flowchart schematically showing the operation of the device of this invention;

FIG. 6 is a flowchart showing the operation of a processing executing section;

FIG. 7 is a diagram showing an example of a rule file in a second embodiment of this invention;

FIG. 8 is a diagram showing an example of a rule file in a third embodiment of this invention; and FIG. 9 is a diagram showing an example of a rule file in a third embodiment of this invention.

DETAILED DESCRIPTION OF THE PREFERRED EMBODIMENTS

Automatic message sending processing device and method of this invention will be described with reference to the accompanying drawings.

Figure 1:
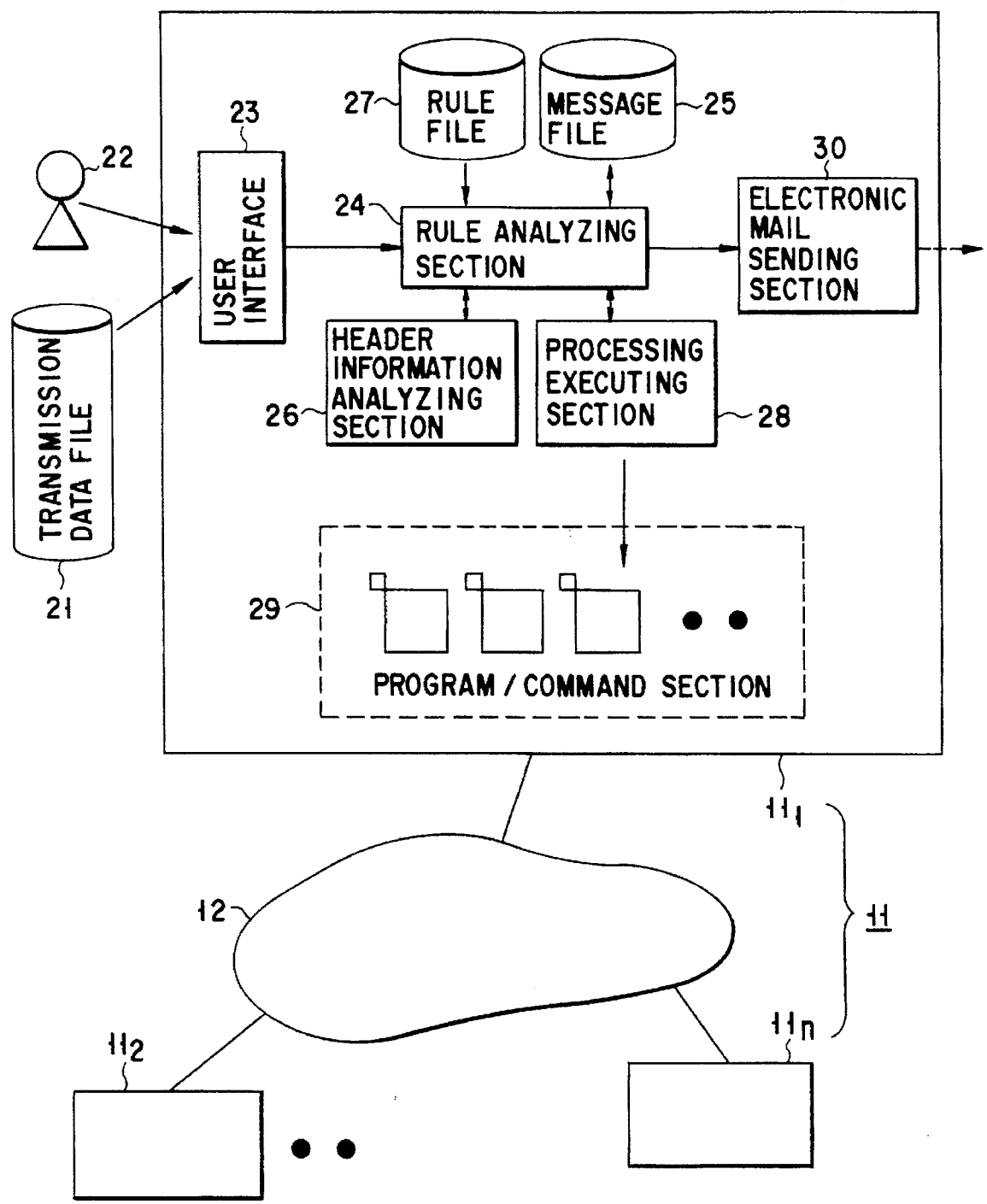
FIG. 1 is a diagram schematically showing the construction of an automatic message sending processing device according to a first embodiment of this invention.

FIG. 1 is a diagram schematically showing the construction of an automatic sending-message processing device according to a first embodiment of this invention, and FIG. 2 is a diagram schematically showing the construction of a rule file of the device of the first embodiment.

Computer systems $11_1, 11_2, \ldots, 11_n$ are connected to one another via communication media 12 so as to permit respective sending messages to be interchanged, thus completing a computer network of an electronic mail system (mail system).

The computer systems $11_1, 11_2, \ldots, 11_n$ have the same construction, so the construction thereof will be explained by taking the computer system $11_1$ as an example.

A transmission data file 21 stores message data of the electronic mail system which is input by a user 22 and header information which is control information of the message data. The header information includes addressee information indicating an addressee of the message data, addresser information indicating an addresser of the message data, subject information constructed by, for example, a character string which will be described later, and message data information indicating the transmission date. The subject information indicates the content of the process to be executed before sending the message data, and if, for example, (trans), (comp) and (crypto) are set as the subject information, the items indicate that it is necessary to execute the processes of data conversion, data compression, and encipherment, respectively, on the message data before transmission.

A user interface 23 is activated by the user 22 to read out the message data and the header information stored in the transmission data file 21 and to transmit them to a rule analyzing section 24 as a message to be sent.

The rule analyzing section 24 calls a header information analyzing section 26 and retrieves a rule file 27 after analyzing the header information. The rule analyzing section 24 checks whether or not subject information obtained by analyzing the header information coincides with identification information set in the condition sections of the rule file 27. When the information coincides, it calls a processing executing section 28 and causes the processing executing section to execute the process set in the processing section of the rule file on the message data. Further, the rule analyzing section 24 transmits the header information and the message data processed before the transmission to an electronic mail sending section 30.

The header information analyzing section 26 analyzes the header information to extract addressee information, addresser information, subject information, and transmission date information as character strings, sets the respective extracted character strings to corresponding variables.

As shown in FIG. 2, the rule file 27 is constructed by a set of multiple "condition section-processing section" sentences (which are hereinafter referred to as "IF-THEN" sentences) based on the language specification of the message data and stores a rule created by the user 22. Identification information for processing the message data is described as a character string after the word "IF", and a program name or command name for processing the message data when the condition is satisfied is described after the word "THEN". The rule analyzing section 26 compares the subject information with the identification information which is constructed by a character string such as "(trans)", "(comp)" or "(crypto)" described in the "IF" phrase. For example, the rule is determined such that if a character string of (trans) is the subject information in the rule file 27, data conversion of the message data is effected, if a character string of (comp) is the subject information, data compression of the message data is effected, and if a character string of (crypto) is the subject information, encipherment of the message data is effected.

The processing executing section 28 sequentially reads out a program or command corresponding to the program or command name described after the "THEN" sentence from a program/command section 29, and executes the same.

The electronic mail sending section 30 sends header information and message data which have been processed before being sent as a message, and transmits the same to the other computer systems 11 as electronic mail via the communication media 12.

Next, the operation of this invention with the above construction is explained.

The operation of the processing device of this invention is explained with reference to the flowchart shown in FIG. 3. FIG. 3 is a flowchart schematically showing the operation of the device of this invention.

The user 22 activates the user interface 23 (step S1) to input message data and header information including addressee information, addresser information, subject information, and transmission date information to the transmission data file 21 (step S2). The header information and sending information are transferred to the message file 25 as a message to be sent.

The rule analyzing section 24 retrieves the rule file 27 to analyze the rules stored in the rule file 27 and check the header information in the sending message (step S3).

The checking is to see whether or not there is header information which satisfies at least one of the rules stored in the rule file 27 (step S4). If it is detected in the step S4 that there is header information which satisfies at least one of the rules stored in the rule file 27, the processing executing section 28 activates a program or command described in the rule from the program/command section 29 and subjects the message data to a process specified by the header information, for example, data conversion process (step S5).

The message data is transferred together with the header information to the electronic mail sending section 30 (step S6) as a message to be sent. The message is then sent to the other computer systems 11 via the communication media 12.

On the other hand, if it is detected in the step S4 that there is no header information which satisfies any of the rules stored in the rule file 27, the process of step S5 is skipped, and the message data is transferred, without being processed together with the header information to the electronic mail sending section 30 as a message. The message is then sent to the other computer systems 11 via the communication media 12.

Figure 4:
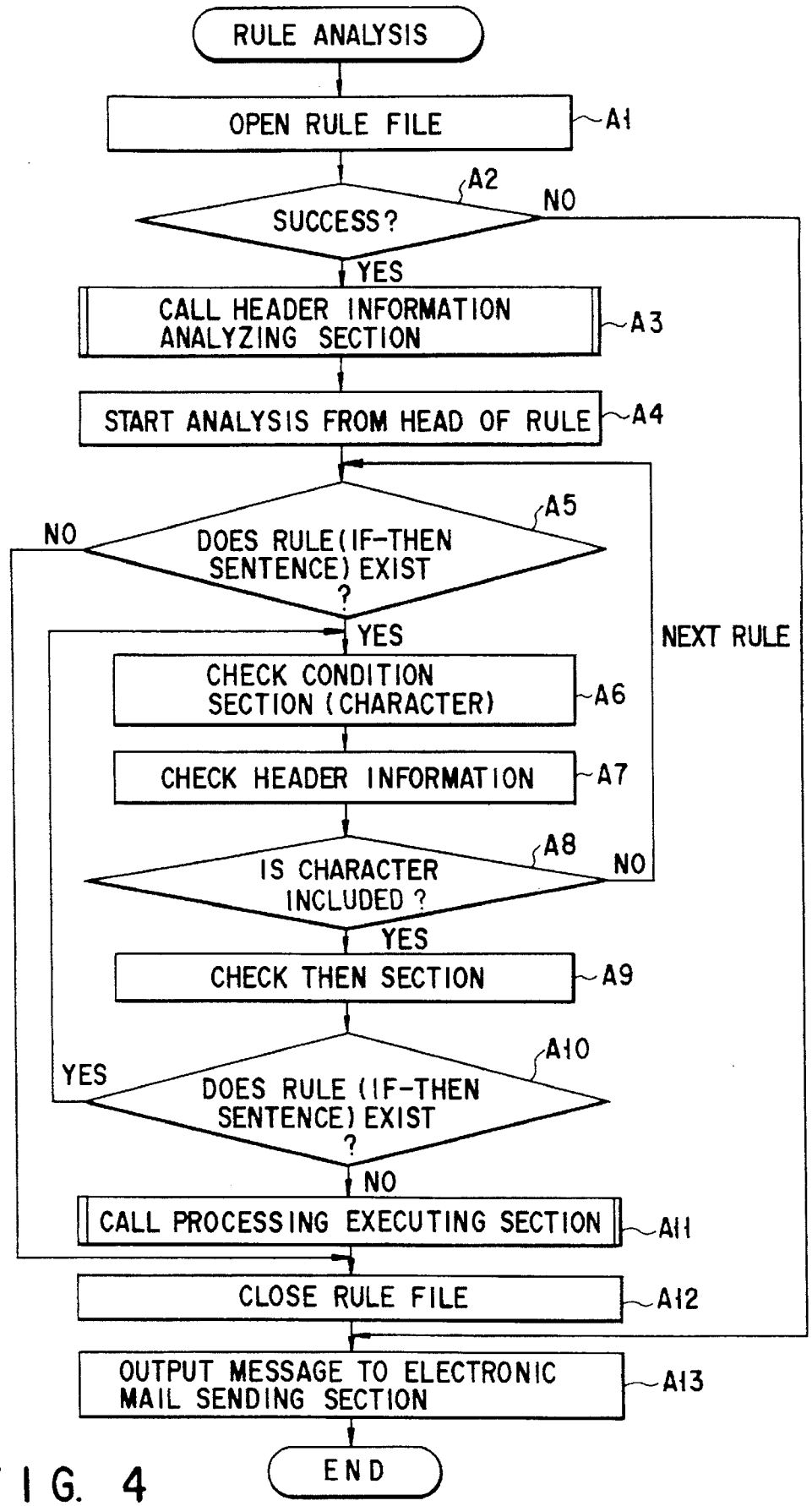
FIG. 4 is a flowchart showing the operation of a rule analyzing section.
Figure 5:
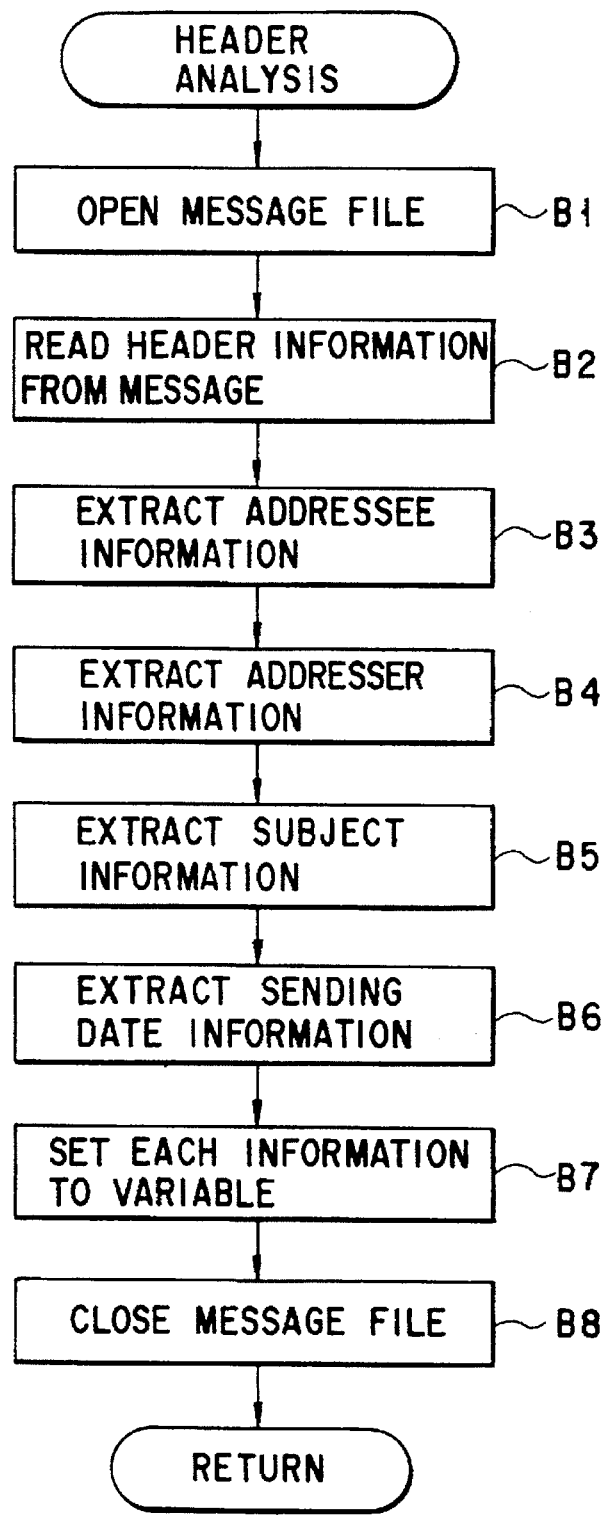
FIG. 5 is a flowchart showing the operation of a header information analyzing section.

Referring to the flowcharts shown in FIGS. 4 to 6, the detailed operations of the rule analyzing section 24, header information analyzing section 26 and processing executing section 28 are explained. FIGS. 4, 5 and 6 are flowcharts showing the operation of the rule analyzing section 24, the operation of the header information analyzing section 26, and the operation of the processing executing section 28, respectively.

The rule analyzing section 24 opens the rule file 27 (step A1). The rule analyzing section 24 checks whether the rule file 27 is successfully opened or not (step A2), and calls the header information analyzing section 26 (step A3) when determining that the rule file 27 is successfully opened. Then, the process shown in FIG. 5 is effected.

The header information analyzing section 26 opens the message file 25 (step B1). The header information analyzing section 26 reads out header information from the message which is to be sent and is stored in the message file 25 (step B2), and extracts addressee information, addresser information, subject information, and transmission date information of the header information as character strings (steps B3 to B6). The header information analyzing section 26 sets each extracted information as a variable (step B7) and closes the message file 25 (step B8). Then, the process of the header information analyzing section 26 is completed and the process is transferred to the step A4 of FIG. 4.

The rule analyzing section 24 starts the analysis of the rules from the head of the rule file 27 (step A4). The rule analyzing section 24 checks whether a rule (IF-THEN sentence) is present or not (step A5), and if a rule (IF-THEN sentence) is present, the following step A6 is effected. If it is determined in step A5 that no rule (IF-THEN sentence) is present, the rule file 27 is closed. Since a rule (IF-THEN sentence) is previously set in the rule file 27 when step A5 is first reached, the result of step A5 becomes "YES" and the process succeeding step A6 is effected.

The rule analyzing section 24 checks identification information (described in a character string form) described in the condition section after the word IF of the rule (IF-THEN sentence) at the head of the rule file 21 (step A6). The rule analyzing section 24 effects the collation with the character string of the subject information derived from the analysis of the header information using the header information analyzing section 26 (step A7).

The rule analyzing section 24 checks whether the character string described in the condition section after the word IF in the rule file 27 is contained in the character string of the subject information (step A8). If it is determined that the character string described in the condition section is not contained in the subject information, the process of step A5 is effected to check whether or not a rule (IF-THEN sentence) is present in the rule file 27. Then, the process from the step A6 to step A8 is effected again. If the rule analyzing section 24 determines in step A8 that the character string described in the condition section after the word IF is contained in the character string of the subject information, it checks the THEN section of the rule (IF-THEN sentence) containing the method character string (step A9).

The name of a program or command to be executed is described in the THEN section of the rule (IF-THEN sentence). When the condition is satisfied as described before, the preprocessing for transferring the program or command name to the processing executing section 28 is effected by the checking operation of step A9.

The rule analyzing section 24 checks whether or not there is a rule (IF-THEN sentence) which has not been retrieved still existing in the rule file 27. That is, the rule analyzing section 24 checks whether the operation of checking all of the rules (IF-THEN sentence) in the rule file 27 is completed or not (step A10).

In step A10, if it is determined that an unexamined rule (IF-THEN sentence) still exists in the rule file 27, the process from step A6 to step A9 is effected again.

If the operation of checking whether any of the character strings described in the condition sections of all of the rules (IF-THEN sentence) in the rule file 27 is contained in the character string of the subject information is completed (step A10), it calls the processing executing section 28 to start the process shown in FIG. 6 (step A11).

The processing executing section 28 reads a message stored in the message file 25 (step C1) and separates the header information and the message data from each other (step C2).

The program names or command names described in the THEN section checked in step A9 are sequentially read (step C3). Specifically, in step C3, if a plurality of character strings (such as (trans), (comp), (crypto), . . . ) are described as the subject information, the names of the programs or commands for effecting the data conversion process, the data compression process and the encipherment process are sequentially read.

It is then checked whether a process such as the data conversion process, the data compression process, and the encipherment process is present or not (step C4). If such a process is present, the program or command stored in the program/command section 29 is activated and one of the processes , i.e., the data conversion, data compression, and encipherment processes, is effected for the message data (step C5).

It is further checked in step C4 whether a process still remains or not, and if there is, the next process is executed (step C5).

When all of the processes are executed (step C4), the header information is combined with the message data which have been subjected to the process step C5 as described before (step C6). After this, the process of step A12 of FIG. 4 is effected.

The rule analyzing section 24 closes the rule file 27 (step A12). Data obtained by combining the header information with the message data which have been subjected to the process of step C5 are transferred as a message to the electronic mail sending section 30 (step A13).

Next, although not shown in the drawing, the electronic mail sending section 30 transmits the sending message as electronic mail to the other computer systems 11 via the communication media.

In a case where it is detected in step A5 that a rule (IF-THEN sentence) exists and it is also determined in step A8 that the character string described in the condition section of the rule (IF-THEN sentence) is not included in the character string of the subject information after the processes of the steps A6 and A7 are effected, the process of the step A5 is effected again. When the operation of retrieving all of the rules (IF-THEN sentence) is completed, the rule analyzing section 24 closes the rule file 27 (step A12) and then transmits the message from the electronic mail sending section 30 without effecting any process on the message data (step A13).

As described above, by describing the message data as a character string indicating the process effected before transmission in the subject information of the header information, the message data can be automatically processed, and the message combined with the header information can be output to the other computer systems 11. Therefore, the process of manually activating each command by the user 22, as is required in the conventional case, can be omitted, thereby simplifying the process and enhancing the efficiency thereof.

In the first embodiment, a desired process is effected by analyzing the subject information of the header information. The second embodiment is an embodiment in which conditions are created from information other than the subject information among the header information of the message; for example, data is sent to an address containing a ".com" character string according to the destination address, or data is sent before (or after) the date specified as "<1993.04.20" by the date information. According to the second embodiment, a key word satisfying the rule in which the process desired to be effected for the message data can be set in the subject, and the data can be automatically processed before being sent by electronic mail based on the destination and the transmission date.

FIG. 7 is a diagram showing an example of the rule file 27 according to the second embodiment of this invention. In the second embodiment, the construction is the same as that shown in FIG. 1 and the operations of the respective sections are the same as those explained with reference to FIGS. 3 to 6. Therefore, the drawing and detailed explanation specifically for the second embodiment are omitted.

A rule according to the second embodiment, for automatically effecting the storage of a copy of the message data based on the condition of the destination address, the broadcast to other users based on the date condition, and the encipherment and compression of data according to the character string of the subject will now be described.

In FIG. 7, ".com", "crypto" and "comp" of the IF sentence in the rule indicate a destination address or key word contained in the subject field used for automatic processing. The data "1993.04.20" is a character string for comparison with the transmission date and time. "crypto_prg $" and "compress_prg $" in the THEN sentence are command names for effecting the encipherment and compression of data like the first embodiment, and they are defined in the form of "crypto_prg file name" and "compress_prg file name", and executed in their normal manner in this specification. "copy_prg" is a command for copying the file and "mail_prg" is a command for sending an electronic mail. They are all contained in the rule file. "$" indicates a message file to be processed in the rule and is rewritten into a file name of a to-be-processed object when a command is activated from the processing executing section.

In order to effect the above-described automatic processing of data, the rule shown in FIG. 7 is described in a part of the message.

The user who is sending the message data specifies the address of an object to which the data is to be transmitted, the subject, and the transmission data file by use of the user interface. In this case, in order to encipher the transmission data, a character of "crypto" is inserted into the subject information as in the first embodiment.

The operation of the second embodiment is substantially the same as that of the first embodiment, so it will only be briefly explained.

Information such as the destination address, the subject character string, and the date are derived from the transmission data containing the header information output to the rule analyzing section 24 by use of the header information analyzing section 26. Then, the rule analyzing section 24 reads the rule file 27 and checks the condition from the head of the file. In this case, since the sentence of "crypto" exists in the subject information, the condition is satisfied in the third rule of FIG. 7, and the process described in the corresponding THEN section is executed. In this example, "crypto_prg $" is executed and "crypto_prg $" is activated from the program/command section 29 in the form of "crypto_prg to-be-processed file name" to execute the process (encipherment) on the transmission data file. When the above process is completed, the remaining portion of the rule is analyzed. If the condition is satisfied, then a corresponding process is executed, and thus, the analysis is effected until the end of the rule.

When the analysis is completed, the enciphered transmission data file is output to the electronic mail sending section 30 and sent as normal electronic mail.

The process of data compression in the above rule is effected in the same manner. If the character string of "comp" is specified at the subject specifying time, the fourth condition in the rule of FIG. 7 is satisfied, and data is sent after data compression is effected. In a case where data is sent after the data is enciphered and compressed, both of the processes are executed for the transmission data by inserting both of the character strings of "crypto" and "comp" into the subject.

The first and second rules of FIG. 7 are not the subject but are the conditions concerning the destination address and the transmission date. The first rule of the rule file indicates the process of effecting the encipherment and compression of data which contains ".com" and then transmission after copying the above data into the directory having a name of "/backup". Further, the second rule indicates the process of transmitting the same message data, whose transmission date is before 1993. 04. 20, to the destination address "user A" by electronic mail.

FIG. 8 is a diagram showing an example of the rule file according to a third embodiment of this invention.

As in the second embodiment, since the construction in the third embodiment is the same as that shown in FIG. 1 and the operations of the respective sections are the same as those explained with reference to FIGS. 3 to 6, the drawing and detailed explanation of the third embodiment are omitted.

An example according to the third embodiment, in which a complicated condition obtained by using a logical expression in combining a plurality of processing conditions is described in the condition section (IF section), will be shown.

In FIG. 8, if the character strings of ".com", "comp", and "crypto" are not all contained in the header information or message data, the process is not executed. If all of the character strings are included therein, the transmission data is sequentially subjected to the compression process and the encipherment process after being copied into the directory having a name of "/backup" according to the condition section (THEN section).

As described above, since a process is not necessarily set in one-to-one correspondence with the condition, that is the condition can be freely created and the process corresponding to the condition can be described, a flexible rule can be created.

In an example according to the third embodiment shown in FIG. 8, complicated conditions combining a plurality of processing conditions by using a logical expression are described and a plurality of processings are performed based on results of processing conditions.

This invention is not limited to the above embodiments.

Multiple "IF-THEN" sentences may be used as shown in FIG. 9.

FIG. 9 is a diagram showing an example of a rule file in a third embodiment of this invention. As shown in FIG. 9, a second IF sentence is included in a first IF-THEN sentence (i.e., forming nesting construction), and this IF-THEN sentence performs the following processing. The rule analyzing section 24 analyzes whether or not the character strings of "crypto" indicating an encipherment process exist in the message data whose transmission date is before 1993. 04. 20. If strings "crypto" are found, the processing executing section 28 performs the encipherment process and sends the electronic mail to the user A.

As described above, since a description of the IF-THEN sentence can be freely described according to the processing, a extremely flexible rule can be created. Therefore, it is possible to automate the processing and enhance the efficiency thereof.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An automatic sending-message processing device applied to a computer network which is connected to a plurality of computer systems via communication media and capable of effecting message switching among said plurality of computer systems by use of an electronic mail system, comprising:

inputting means for permitting a user to input control information for mail message data to be sent;

rule storing means for storing a rule according to the language specification of a mail message and including a processing condition and a processing content identifying a process to be performed on the mail message data when the processing condition is satisfied;

rule creating means for permitting the user to create the rule stored in said rule storing means;

control information analyzing means for analyzing the control information of the mail message data;

interpreting means for collating the analyzed control information with the processing condition to interpret a process to be executed; and processing means for executing a process corresponding to the process interpreted by said interpreting means on the mail message data to be sent.

2. An automatic sending-message processing device according to claim 1, wherein said rule storing means includes means for storing a condition section for describing identification information indicating the processing condition, and a processing section for describing the content of the process obtained when the processing condition is satisfied.

3. An automatic sending-message processing device according to claim 2, wherein said processing section further contains at least one pair of said condition section and said processing section.

4. An automatic sending-message processing device according to claim 2, wherein said rule storing means includes means for storing a conditional expression obtained by combining a plurality of processing conditions by use of a logical expression.

5. An automatic sending-message processing device according to claim 1, wherein said processing means includes means for separating the control information and mail message data from each other.

6. An automatic sending-message processing device according to claim 5, wherein said processing means further includes means for combining the control information and the processed mail message data.

7. An automatic sending-message processing device according to claim 1, further comprising sending means for sending the mail message data processed by said processing means after attaching the control information to the mail message data.

8. An automatic sending-message processing device according to claim 1, wherein said control information analyzing means includes means for extracting a character string containing at least addressee information, addresser information, subject information and transmission date information.

9. An automatic sending-message processing device according to claim 8, wherein said control information analyzing means includes means for setting the extracted character string as a variable.

10. An automatic sending-message processing device applied to a computer network which is connected to a plurality of computer systems via communication media and capable of effecting message switching among said plurality of computer systems by use of an electronic mail system, comprising:

input means for permitting a user to input mail message data and control information for the mail message data;

a rule file containing a set of multiple "condition section-processing section" sentences based on the language specification of the mail message, the condition section having identification information indicating a processing condition for the mail message data and the processing section having a process which is effected when the condition of the condition section is satisfied;

rule creating means for permitting the user to create a rule stored in said rule file;

control information analyzing means for analyzing the control information to obtain subject information indicating at least the content of the process corresponding to the mail message data;

processing means for executing a process set in the processing section of said rule file;

rule analyzing means for retrieving said rule file after analyzing the control information by means of said control information analyzing means, and executing the process set in the processing section on the mail message data by activating said processing means when the subject information coincides with the identification information; and sending means for sending the control information and the processed mail message data.

11. An automatic sending-message processing device according to claim 10, wherein said rule file includes means for storing a conditional expression derived by combining a plurality of processing conditions by use of a logical expression.

12. An automatic sending-message processing device according to claim 10, wherein said control information analyzing means includes means for extracting addressee information, addresser information, and transmission date information.

13. An automatic sending-message processing device according to claim 12, wherein said control information analyzing means includes means for setting the subject information, the addressee information, the addresser information, and transmission date information as a variable.

14. An automatic sending-message processing method applied to a computer network which is connected to a plurality of computer systems via communication media and capable of effecting message switching among said plurality of computer systems by use of an electronic mail system, comprising:

a first step of creating and storing by a user a rule according to a language specification of a mail message and including a processing condition for processing mail message data and a content of a process which is executed when the processing condition is satisfied;

a second step of inputting mail message data and control information by the user for the mail message data;

a third step of analyzing the control information of the mail message data;

a fourth step of collating the analyzed control information with the processing condition;

a fifth step of subjecting the mail message data to a preset process based on the collation; and a sixth step of sending the processed mail message data after attaching the control information to the mail message data.

15. An automatic sending-message processing method according to claim 14, wherein said first step includes a step of preparing a conditional expression obtained by combining a plurality of processing conditions by use of a logical expression as a processing condition for processing mail message data.

16. An automatic sending-message processing method according to claim 14, wherein said third step includes a step of extracting a character string containing at least addressee information, addresser information, subject information and transmission date information.

17. An automatic sending-message processing method according to claim 16, wherein said third step includes a step of setting the extracted character string as a variable.

18. An automatic sending-message processing method according to claim 14, wherein said fifth step includes a step of separating the control information and mail message data from each other.

19. An automatic sending-message processing method according to claim 18, wherein said fifth step further includes a step of combining the control information and the processed mail message data.

* * * * *